(12) United States Patent
Kruglikov et al.

(10) Patent No.: US 10,572,551 B2
(45) Date of Patent: Feb. 25, 2020

(54) APPLICATION CONTAINERS IN CONTAINER DATABASES

(71) Applicant: Oracle International Corporation, Redwood Shores, CA (US)

(72) Inventors: Andre Kruglikov, Atherton, CA (US); Kumar Rajamani, San Ramon, CA (US); Thomas Baby, Auburn, WA (US); Philip Yam, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 687 days.

(21) Appl. No.: 15/331,525

(22) Filed: Oct. 21, 2016

(65) Prior Publication Data

US 2017/0116334 A1   Apr. 27, 2017

Related U.S. Application Data

(60) Provisional application No. 62/395,267, filed on Sep. 15, 2016, provisional application No. 62/245,937, filed on Oct. 23, 2015.

(51) Int. Cl.
G06F 16/00 (2019.01)
G06F 16/951 (2019.01)
G06F 16/22 (2019.01)

(52) U.S. Cl.
CPC .......... *G06F 16/951* (2019.01); *G06F 16/22* (2019.01)

(58) Field of Classification Search
CPC .... G06F 16/21; G06F 16/24554; G06F 16/25; G06F 16/252; G06F 16/27; G06F 16/283

(Continued)

(56) References Cited

U.S. PATENT DOCUMENTS 6,185,699 B1   2/2001   Haderle
6,205,449 B1   3/2001   Rastogi
(Continued)

FOREIGN PATENT DOCUMENTS

WO   WO 2006/045844 A1   5/2006
WO   WO 2014/052851   4/2014
(Continued)

OTHER PUBLICATIONS

Yam, U.S. Appl. No. 15/266,917, filed Sep. 15, 2016, Final Office Action, dated Feb. 4, 2019.
(Continued)

*Primary Examiner* — Michelle N Owyang
(74) *Attorney, Agent, or Firm* — Hickman Palermo Becker Bingham LLP

(57) ABSTRACT

In an approach, memory usage within a database management system is optimized by designating an application root which stores data and metadata for database objects that are common across pluggable databases which support the same application. In addition, the application root can be used to manage access to the pluggable databases by defining common users which are created at the application root, but can be used to access any of the member pluggable databases. Furthermore, different versions of the same application can be supported concurrently by maintaining separate application roots for each version. For instance, when an upgrade is applied to the application root, a clone can be created and the update can be applied to the clone. Then, the member pluggable databases which are to be upgraded can be synchronized to the clone, while leaving other pluggable databases servicing the previous version of the application.

23 Claims, 6 Drawing Sheets

(58) Field of Classification Search
USPC .................................................. 707/705–780
See application file for complete search history.

(56) References Cited

U.S. PATENT DOCUMENTS

| | | | |
|---|---|---|---|
| 6,226,650 B1 | 5/2001 | Mahajan | |
| 6,295,610 B1 | 9/2001 | Ganesh | |
| 6,804,671 B1 | 10/2004 | Loaiza et al. | |
| 7,305,421 B2 | 12/2007 | Cha | |
| 7,493,311 B1* | 2/2009 | Cutsinger | G06F 16/2471 |
| 7,822,717 B2 | 10/2010 | Kappor et al. | |
| 8,117,174 B2 | 2/2012 | Shaughessey | |
| 8,364,648 B1 | 1/2013 | Sim-Tang | |
| 8,478,718 B1 | 7/2013 | Ranade | |
| 9,026,679 B1 | 5/2015 | Shmuylovich | |
| 9,122,644 B2 | 9/2015 | Kruglikov et al. | |
| 2002/0112022 A1 | 8/2002 | Kazar et al. | |
| 2002/0143733 A1 | 10/2002 | Mukkamalla | |
| 2003/0061537 A1 | 3/2003 | Cha et al. | |
| 2004/0039962 A1 | 2/2004 | Ganesh | |
| 2004/0054643 A1 | 3/2004 | Vermuri | |
| 2004/0054644 A1 | 3/2004 | Ganesh | |
| 2004/0177099 A1 | 9/2004 | Ganesh | |
| 2004/0210577 A1 | 10/2004 | Kundu | |
| 2004/0267809 A1 | 12/2004 | East et al. | |
| 2005/0038831 A1 | 2/2005 | Souder et al. | |
| 2005/0149552 A1 | 7/2005 | Chan et al. | |
| 2005/0278276 A1 | 12/2005 | Andreev et al. | |
| 2006/0047713 A1 | 3/2006 | Gornshtein | |
| 2007/0100912 A1 | 5/2007 | Pareek et al. | |
| 2007/0118527 A1* | 5/2007 | Winje | G06F 21/6218 |
| 2007/0244918 A1 | 10/2007 | Lee et al. | |
| 2010/0185645 A1 | 7/2010 | Pazdziora | |
| 2010/0318570 A1 | 12/2010 | Narasinghanallur et al. | |
| 2011/0004586 A1 | 1/2011 | Cherryholmes et al. | |
| 2011/0060724 A1 | 3/2011 | Chan | |
| 2011/0087633 A1 | 4/2011 | Kreuder et al. | |
| 2011/0307450 A1 | 12/2011 | Hahn et al. | |
| 2012/0109926 A1 | 5/2012 | Novik et al. | |
| 2012/0284228 A1 | 11/2012 | Ghosh | |
| 2012/0287282 A1 | 11/2012 | Lu | |
| 2012/0323849 A1 | 12/2012 | Garin | |
| 2013/0085742 A1 | 4/2013 | Barker et al. | |
| 2013/0117237 A1 | 5/2013 | Thomsen et al. | |
| 2013/0198133 A1 | 8/2013 | Lee | |
| 2013/0212068 A1 | 8/2013 | Talius et al. | |
| 2014/0032525 A1 | 1/2014 | Merriman et al. | |
| 2014/0095452 A1 | 4/2014 | Lee et al. | |
| 2014/0095530 A1 | 4/2014 | Lee et al. | |
| 2014/0095546 A1 | 4/2014 | Kruglikov et al. | |
| 2014/0164331 A1 | 6/2014 | Li et al. | |
| 2014/0337336 A1* | 11/2014 | Carlson | H04L 67/1097 707/736 |
| 2015/0120659 A1 | 4/2015 | Srivastava | |
| 2015/0254240 A1 | 9/2015 | Li et al. | |
| 2017/0116278 A1 | 4/2017 | Baby et al. | |
| 2017/0116321 A1 | 4/2017 | Jain et al. | |
| 2018/0075044 A1 | 3/2018 | Kruglikov | |
| 2018/0075086 A1 | 3/2018 | Yam | |

FOREIGN PATENT DOCUMENTS

| | | | |
|---|---|---|---|
| WO | WO2014/052851 A1 | 4/2014 | |
| WO | WO 2014/052851 A1 | 4/2014 | |
| WO | WO 2014/145230 A1 | 9/2014 | |

OTHER PUBLICATIONS

Krugikov, U.S. Appl. No. 15/266,902, filed Sep. 15, 2016, Interview Summary, dated Feb. 20, 2019.

Krugikov, U.S. Appl. No. 15/266,902, filed Sep. 15, 2016, Final Office Action, dated Jan. 31, 2019.

Yam, U.S. Appl. No. 15/266,917, filed Sep. 15, 2016, Office Action, dated Jun. 21, 2019.

Jain, U.S. Appl. No. 15/331,534, filed Oct. 21, 2016, Office Action, dated Jun. 28, 2019.

Baby, U.S. Appl. No. 15/331,540, filed Oct. 21, 2016, Office Action, dated Jul. 9, 2019.

Rajeev Kumar et al., Oracle DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Oracle Base, Multitenant: Create and Configure a Pluggable Database (PDB) in Oracle Database 12c Release 1 (12.1), dated Jan. 8, 2014, 16 pages.

Muhammad Anwar, How to Install Oracle 12c Multitenant Pluggable Database Dated Feb. 24, 2012, 27 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud", 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

U.S. Appl. No. 14/202,091, filed Mar. 10, 2014, Notice of Allowance, dated Feb. 26, 2016.

U.S. Appl. No. 13/830,349, filed Mar. 14, 2013, Office Action, dated Nov. 5, 2014.

U.S. Appl. No. 13/830,349, filed Mar. 14, 2013, Notice of Allowance, dated Oct. 19, 2015.

U.S. Appl. No. 13/830,349, filed Mar. 14, 2013, Interview Summary, dated Mar. 9, 2015.

U.S. Appl. No. 13/830,349, filed Mar. 14, 2013, Final Office Action, dated Jun. 2, 2015.

U.S. Appl. No. 13/631,815, filed Sep. 28, 2012, Office Action, dated Nov. 6, 2014.

U.S. Appl. No. 13/631,815, filed Sep. 28, 2012, Notice of Allowance, dated Aug. 20, 2015.

U.S. Appl. No. 13/631,815, filed Sep. 28, 2012, Notice of Allowance, dated Apr. 3, 2015.

U.S. Appl. No. 13/631,815, filed Sep. 28, 2012, Office Action, dated Dec. 23, 2013.

U.S. Appl. No. 13/631,815, filed Sep. 28, 2012, Office Action, dated May 29, 2014.

Kruglikov, U.S. Appl. No. 15/266,902, filed Sep. 15, 2016, Office Action, dated Aug. 6, 2018.

Yam, U.S. Appl. No. 15/266,917, filed Sep. 15, 2016, Advisory Action, dated Apr. 29, 2019.

Baby, U.S. Appl. No. 15/331,657, filed Oct. 21, 2016, Notice of Allowance, dated Mar. 4, 2019.

Yam, U.S. Appl. No. 15/266,917, filed Sep. 15, 2016, Interview Summary, dated Oct. 19, 2018.

Kruglikov, U.S. Appl. No. 15/266,902, filed Sep. 15, 2016, Interview Summary, dated Oct. 1, 2018.

Baby, U.S. Appl. No. 15/331,657, filed Oct. 21, 2016, Office Action, dated Aug. 28, 2018.

* cited by examiner

APPLICATION CONTAINERS IN CONTAINER DATABASES

PRIORITY CLAIMS AND RELATED APPLICATIONS

This application claims the benefit of U.S. Provisional Application No. 62/245,937, filed Oct. 23, 2015 and U.S. Provisional Application No. 62/395,267, filed Sep. 15, 2016; the entire contents of the aforementioned applications is hereby incorporated by reference for all purposes as if fully set forth herein.

FIELD OF THE INVENTION

The present invention generally relates to techniques for managing pluggable databases within a pluggable database that are used by the same application through a specialized pluggable database referred to as an application root.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Multitenant Architecture

A container is a collection of schemas, objects, and related structures in a multitenant container database (CDB) that appears logically to an application as a separate database. Within a CDB, each container has a unique ID and name. The root database and every pluggable database (PDB) is considered a container. PDBs isolate data and operations so that from the perspective of a user or application, each PDB appears as if it were a traditional non-CDB. Each PDB is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as tables. If data for a database object is stored in a tablespace, a database dictionary maps a database object to one or more tablespaces that hold the data for that database object.

The root container, also called "the root", is a collection of schemas, schema objects, and nonschema objects to which all PDBs within a particular CDB belong. Every CDB has one root which stores the system metadata required to manage all PDBs within the CDB. In some implementations, the root does not store "user" data but instead stores data that is common across the PDBs of the CDB, such as definitions for common users and roles, shared tables, code packages, and so forth. A PDB comprises a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application. However, since shared resources are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

DETAILED DESCRIPTION

Figure 1:
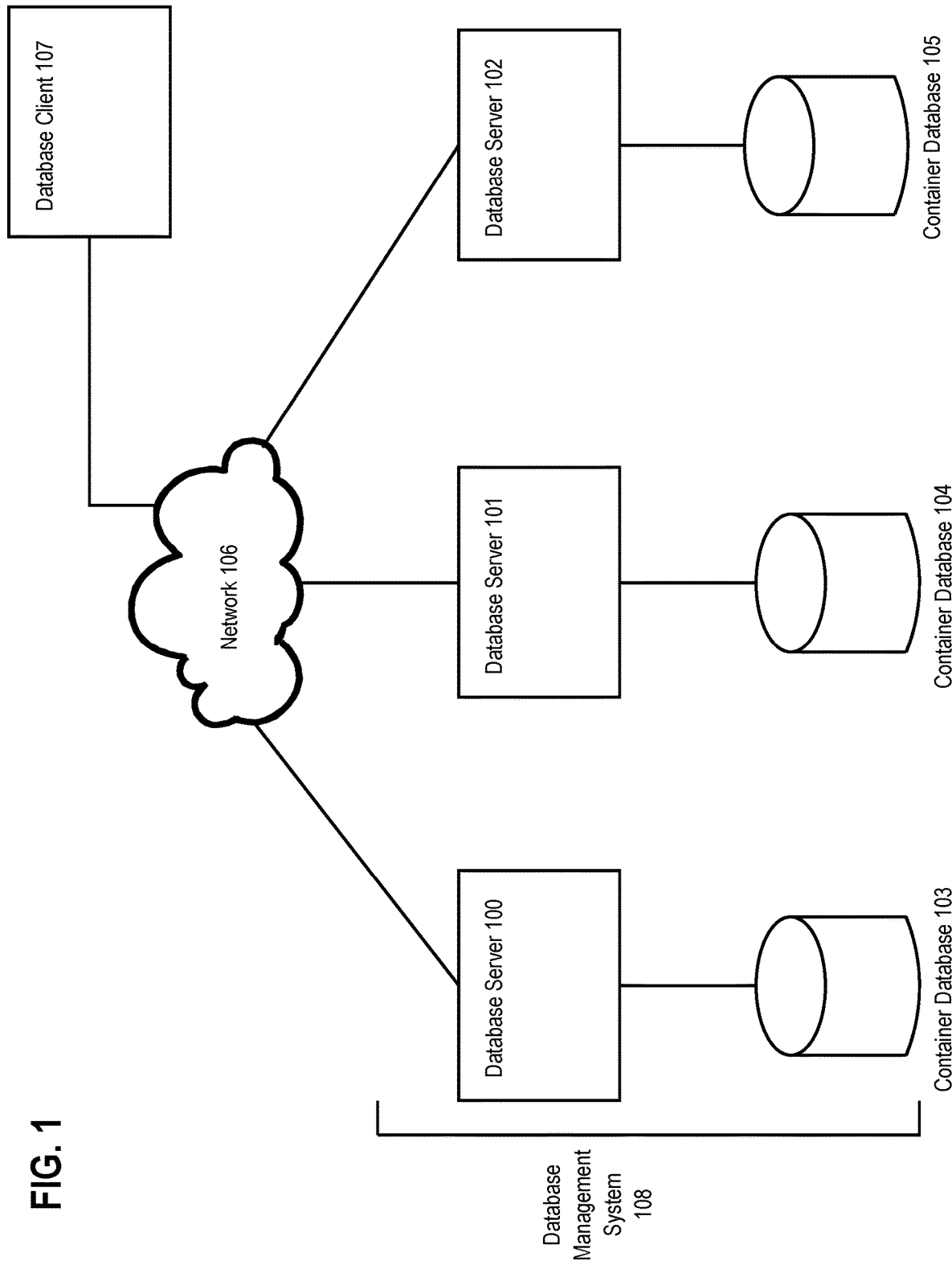
FIG. 1 illustrates an operating environment upon which an embodiment may be implemented.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The detailed description is laid out in the following sections:

1.0 General Overview
   1.1 Proxy Pluggable Databases
   1.2 Application Root Replicas
   1.3 Container Maps
   1.4 Query Optimization
2.0 Database Systems
3.0 General Operating Environment
   3.1 Container Database
   3.2 Undo and Redo Records
4.0 Application Containers
   4.1 Data Link and Metadata Link Example
   4.2 Creating an Application Root
   4.3 Executing Commands at an Application Root
   4.4 Application Users and Roles
   4.5 Patching and Upgrading Applications
   4.6 Transporting Application Roots
6.0 Hardware Overview
7.0 Additional Disclosure 1.0 General Overview While the root is useful for optimizing memory usage within a container database by allowing common objects and definitions to be stored in one location and shared among multiple pluggable databases, roots also have their limitations.

1.1 Memory Optimization

Since root databases store data and metadata that is shared among all the PDBs of the CDB, the information stored by the root database is typically installed by the database software provider and includes objects/items such as common code/functions, tables of diagnostic information, tables of metrics, definitions of common users and roles, and so forth. Users of the DBMS are generally discouraged or prevented from storing their own metadata and data in the root since any mishap related to the root could cause the entire DBMS to malfunction. However, there are situations where a user may want to define common data and metadata that applies only a subset of the PDBs within a CDB and store those common objects in a single location that is shared among the subset of PDBs.

Once common scenario where the aforementioned function would be useful is in the context of applications. While each of the PDBs may represent a different database, some databases may implement or be used by the same application. For instance, a user may define two different PDBs which store data for two different store locations, but are configured to be accessed using the same application. As a result, there may be data and/or metadata that is shared between the two PDBs which could benefit from memory optimization. For instance, the application used to access the PDBs may expect that a table named "Employees" to exist which contains attributes such as "First Name", "Last Name", "Age", and so forth. The data for the Employees table would differ between the two PDBs, but the metadata defining the name, attributes, and attribute types of the table could be shared.

Thus, embodiments described herein use a new type of PDB referred to herein as an "application root". Similar to the root of the CDB, an application root stores data and metadata that is shared among its member PDBs. The application root and its member PDBs are referred to collectively as an "application container". However, while every PDB in the CDB is a member of the root, only PDBs which implement or are used by the same application are members of the application root. By storing the common data and metadata used by an application at the application root, rather than separately in each member PDB, memory usage is optimized since shared objects are stored only once and then referenced by the member PDBs.

In the context of an application root there are two classifications of data. The first classification is referred to as "data-linked". Database objects that are data-linked have both the metadata defining the object and the data itself stored in the application root. Thus, if a user is connected to the application root, data-linked objects are accessed using the data dictionary and tablespace files of the application root. On the other hand, if a user is connected to a member PDB of the application root, an attempt to access a data-linked object causes the DBMS to context switch and use the data dictionary and tablespace files of the application root, rather than the PDB to which the session was established. Data-linked objects are useful for when both the definition of the database object and the data for the database object are common across the member PDBs.

The second classification is referred to as "metadata-linked". Database objects which are metadata-linked have their definitions stored in the application root, but the data for the objects is stored in the individual member PDBs. A scenario in which metadata-linked objects are useful is the example presented above with regard to the Employees table, where the definition of the table would be stored once in the application root and is common across the member PDBs, but each member PDB has its own data for the table. Thus, if a user is connected to the application root, metadata-linked objects have their definition accessed through the data dictionary of the application root, but the data itself is read from the tablespace files of one or more member PDBs. In the case of a session established to one of the member PDBs, accessing a metadata-linked object causes the definition to be accessed using the data dictionary of the application root, but the data itself is accessed using the tablespace files of the member PDB.

The pluggable databases under the application root may also have data and metadata for which both the objects and the definitions of the objects are stored in the tablespace files and database dictionary of the member PDBs respectively. This allows each of the pluggable databases to have their own unique objects. Furthermore, the concept of data-linked and metadata-linked objects also applies to root databases of the CDB, which can perform the same type of sharing with its member PDBs. Thus, in some embodiments, two levels of sharing exist, one at the root database which stores data and metadata common to all PDBs and another one at the application root which stores data and metadata common across PDBs which are utilized by the same application.

1.2 Managing Application Users and Roles

In addition to memory optimization, application roots can also be used to efficiently manage multiple PDBs from a single location. For example, the root of a CDB can be used to store information for users and roles which are common across all PDBs. Roles in this context refer to a set of permissions which can be bundled together and assigned to users by referencing the name of the role, rather than individually granting the user each of the permissions. However, there may be users and roles which should be established among PDBs which are used by the same application, but not across all PDBs of the CDB. Thus, in some embodiments, the DBMS is configured to allow the establishment of "application users" and "application roles" within an application root which then apply across the entire application container.

For example, referring back to the store location PDB example, there may be a user which represents a district manager which should have permission to read and write to any PDB within the application container. Rather than connecting to each PDB within the application container and defining the user individually, the user can instead be defined once at the application root and shared among the member PDBs. As a result, the application user can be created efficiently with respect to both memory (e.g. password information, permissions, and so forth can be stored once in the root, rather than being copied to all PDBs) and time (e.g. the administrator can establish one session to the application root and issue the instruction to create the user rather than creating the user at each member PDB individually).

However, in some embodiments the information defining the application users and application roles may also be automatically mirrored onto the individual PDBs during or after creation within the application root. One reason for performing this mirroring is to ensure that users and roles carry over in the event a member PDB is transported to a new CDB.

1.3 Application Patch and Update Management

Application roots can also be used for the effective management of patches and updates to an application across the application container. When an application is patched or updated, various metadata and/or data within an application container is modified. For example, a meta-data linked table may be updated to include a new column, which would require the definition of the table to be modified to identify the new column within the application root and the data for the table would need to be modified within the member PDBs to include the new column.

As used herein, a patch refers to modifications made within an application container which are compatible with previous versions of the application whereas an update refers to modifications which cause previous versions of the application to become incompatible. What makes a modification incompatible with previous versions may differ from embodiment to embodiment and therefore could be defined in any number of arbitrary ways. For example, one embodiment may indicate that any change to a definition of a database object necessitates an update, whereas changes to the data of a database object can be performed in a patch. As another example, removal of a stored function which is relied upon by the previous version of the application may necessitate an update, whereas modification of the stored update may be performed in a patch. As yet another example, an embodiment may define a rule that any change which removes data (that could potentially be relied upon by the previous version of the application) must be performed during an update.

In some embodiments, each application root and member PDB stores as metadata a version number for the application to which it was last updated. A patch or update is performed by executing a set of commands associated with the patch or update at the application root. For example, the set of commands may be included in a script which is referenced by a patch or update command issued to the application root. The behavior of the DBMS varies depending on whether a patch or an update is being processed.

If an update is being applied to the application root, the DBMS clones the application root and then performs the update on the clone. This allows the member PDBs to remain open and available for service while the update is being performed. When the clone has finished updating, the version number of the clone is updated and sync commands are issued to the member PDBs. The sync commands update the member PDBs, such as updating data and/or metadata stored within the member PDBs, updating any pointers to the original application root to reference the clone, and/or updating the application version number of the PDBs. In some cases, the set of instructions may be subdivided into instructions to issue on the application root and instructions to issue to member PDBs to synchronize the PDBs to the application root. Thus, the update to the application root may be performed using the former instructions and synching a PDB to the application root may be performed using the later instructions.

The sync commands may be issued automatically or manually. For example, in some cases the administrator may not wish to update all the member PDBs to the new version of the application. Therefore, after the clone has been updated, the sync command may be issued only to those PDBs which are to be synched to the new version of the application. The remaining PDBs which have not been synchronized to the clone can continue functioning under the original application root. Thus, it is possible to service multiple versions of the same application within the same CDB concurrently by having each version use its own application container.

If a patch is being performed, the DBMS issues the commands stored in the set of commands on the application root. Since the changes are compatible with previous versions of the application, a clone of the application root is not generated and instead the patch is performed on the present application root. Depending on the embodiment, the database objects or portions of database objects that are currently being updated may be locked which could cause some delays with processing commands, but the application container can generally remain open during the patching. When the patch is completed, the member PDBs are automatically or manually synced to the new version of the application.

2.0 Database Systems

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to one or more databases. Typically, the nodes are interconnected via a network and share access, in varying degrees, to storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

3.0 General Operating Environment

FIG. 1 illustrates an example computer-networking environment upon which an embodiment may be implemented. Although FIG. 1 only depicts a particular number of each element, a practical environment may have many more, perhaps hundreds or thousands, of each of the elements illustrated in FIG. 1.

In FIG. 1, database server 100, database server 101, and database server 102 (collectively "the database servers") each represent a combination of software and resources on one or more computing devices that are communicatively coupled to their respective databases (container database 103, container database 104, and container database 105 respectively) and are communicatively coupled to each other via network 106 and also to database client 107. Container database 103, container database 104, and container database 105 are collectively referred to as "the container databases". An example of a computing device upon which the database servers may be implemented is described below in the "Hardware Overview". In some embodiments, the database servers are configured to accept user commands, such as such as queries, Data Definition Language (DDL), and Data Manipulation Language (DML) instructions, and carry out those commands on their respective container database.

In an embodiment, network 106 represents one or more local networks, wide area networks, internetworks, or service provider networks. In some embodiments, network 106 represents the Internet.

In an embodiment, the database client 107 represents a combination of software and resources on one or more computing devices which implements one or more applications that send commands to the database servers in order to retrieve, modify, delete, or submit data stored by the container databases. An example of a computing device upon which the database servers may be implemented is described below in the "Hardware Overview".

3.1 Container Database

Figure 2:
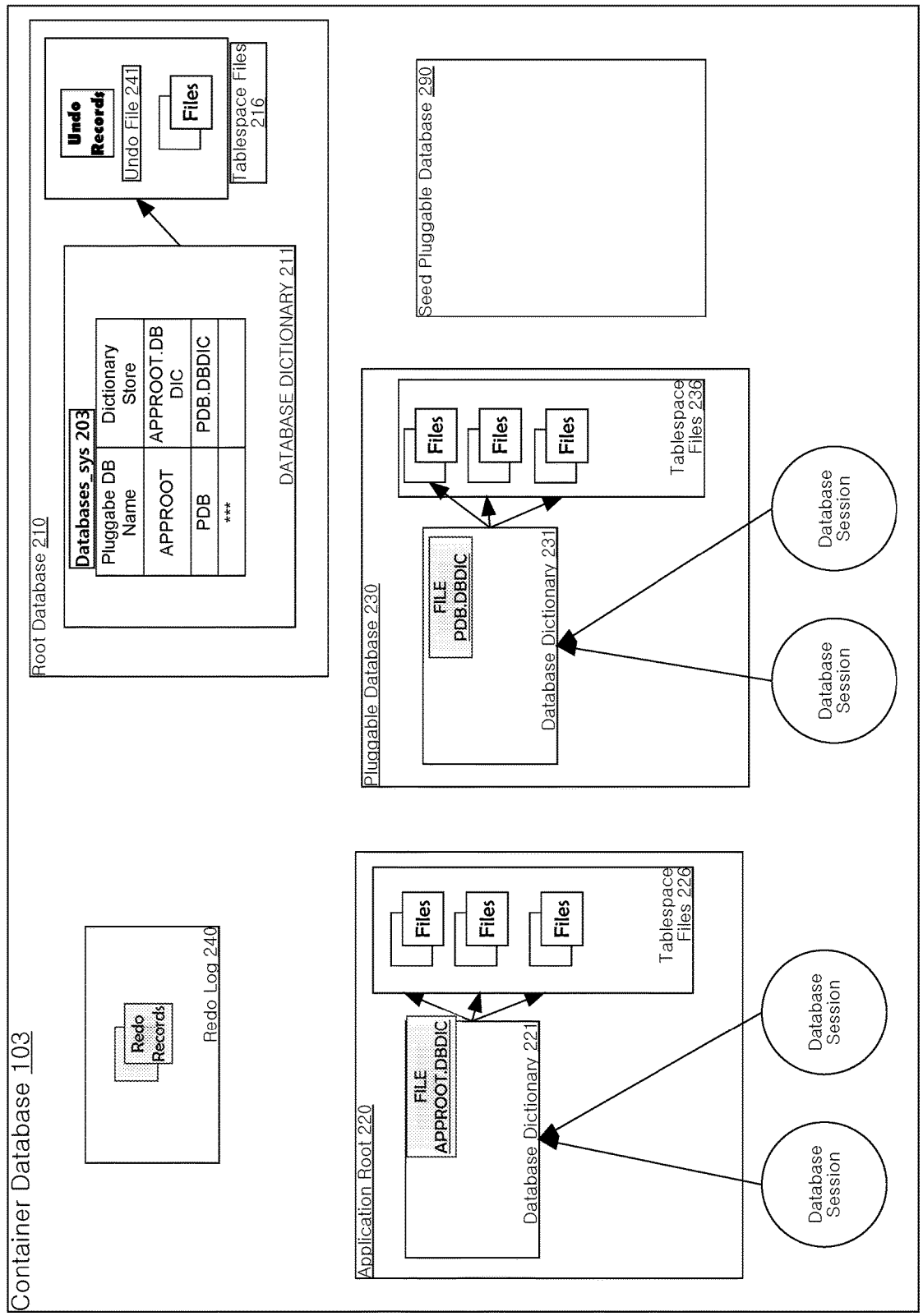
FIG. 2 illustrates an example structure of a container database according to an embodiment.

FIG. 2 illustrates an example structure for a general container database according to an embodiment. In order to illustrate clear examples, FIG. 2 is described with respect to container database 103, but the description is applicable to other container databases, such as container database 104 and container database 105 as well.

Container database 103 contains multiple databases that are hosted and managed by database server 100. The databases include application root 220, pluggable database 230, and root database 210, which is associated with the application root 220 and the pluggable database 230, as shall be explained in greater detail below. In other embodiments, the container database 103 may contain more pluggable databases than the number of pluggable databases that are depicted in FIG. 2. However, due to inherent hardware limitations, some implementations may set an upper limit on the number of pluggable databases that the container database 103 can support. Root database 210 is a database that is used by the database server 100 to globally manage container database 103, and to store metadata and/or data for "common database objects" that are accessible to users of the PDBs within the container database 103.

Application root 220 is a database that is used by the database server 100 to store metadata and/or data for database objects which are shared among a subset of the PDBs within the container database 103 which are used by or implement the same application. The application root 220 stores database dictionary 221, which stores definitions for data-linked and metadata-linked database objects, common users and roles for the application container, identifiers for the member PDBs of the application container, and so forth. Data for data-linked database objects of the application root 220 are stored in tablespace files 226. Metadata contained in the database dictionary 221 is stored in file APPROOT.DIC. In some embodiments, the metadata of the application root 220 that specifies the version number of the application that the application root 200 implements is stored in the database dictionary 221. Similarly, the application version number of the member PDBs may be stored in the respective database dictionaries of the member PDBs.

Pluggable database 230 includes database dictionary 231. Tablespace Files 236 store data for database objects of pluggable database 230. Metadata for database dictionary 231 is stored persistently in file PDB.DBDIC.

The database server 100 responsible for the container database 103 may establish database sessions to the root database 210, the application root 220, or any of the member pluggable databases. The database to which the database session connects determine the scope of the commands issued by the database client 107 (e.g. which database(s) the command will be executed on), which permissions are checked, which database dictionaries will be used for the session, and so forth.

Root database 210 is a database used by the database server 100 to globally manage the container database 103. An important function facilitated by root database 210 is to define pluggable databases within the container database 103. Similar to pluggable databases, the root database 210 includes a database dictionary 211. The database dictionary of a root database may be referred to herein as a root database dictionary. Database dictionary 211 contains metadata that defines various aspects of the container database 103 needed to administer container database 103 and the pluggable databases contained therein. Data for database objects defined by database dictionary 211 is stored in tablespace files 216.

Database dictionary 211 includes database object Database_sys 303, which may be represented as a table. Database_sys 203 defines pluggable databases within the container database 103 and attributes of Database_sys 203 each describe an aspect or property of a pluggable database. The attribute Pluggable DB is a name or label for a pluggable database. The attribute Dictionary Store identifies a dictionary store that holds metadata pointing towards the database dictionaries of the member pluggable databases. One record in database dictionary 211 defines application root 220 and its dictionary store file APPROOT.DBIDC. Another record in database dictionary 211 defines pluggable database 230 and its dictionary store PDB.DBIDC.

The database dictionary 221 of the application root 220 contains a structurally identical table to Database_sys 203, which identifies the pluggable databases which are members of the application container of the application root 200 and describes the aspects and/or properties of the member PDBs.

In an embodiment, the database dictionary 211 defines common database objects that are shared or commonly used by the pluggable databases in container database 103. A common database object is defined in a pluggable database dictionary, which includes a reference to the common database object in the respective root database dictionary. Examples of common database objects include vendor supplied functions, utilities, tables, and views. In an embodiment, database dictionary 221 defines common database objects that are shared or commonly used by the member PDBs of the application root 220.

According to an embodiment, with respect to the root database 210 and application root 220 there are two types of common database objects: a metadata-linked object and an object-linked object, which have been described previously.

Seed pluggable database 290 contains database objects and a database dictionary. Seed pluggable database 290 is cloned to rapidly create a nascent pluggable database and facilitates fast provisioning of such pluggable databases. Seed pluggable database 290 contains a basic set of database objects that are commonly needed and/or used. For example, seed pluggable database 290 may contain database object links to common database objects and views for accessing the pluggable database dictionary and other system information.

3.2 Undo and Redo Records

Tablespace files 216 of the root database 210 include an undo file 241, which the database server 100 uses to store data and/or metadata ("undo records") related to transactions on the databases contained within container database 103. In some embodiments, the undo records store a before and after image of the data being modified during the transactions. For example, if during a transaction the Database Server 350 modifies a "STATE" column of a particular row to change the value from "OHIO" to "CALIFORNIA", the database server 100 also stores an undo record in the undo file 341 specifying the before value "OHIO", the after value "CALIFORNIA", and the location of the modification (e.g. the data block or blocks being modified). If a transaction needs to be rolled back, the database server 100 backtracks through the undo records to reverse any modifications the transaction had performed.

Undo records can be used for a variety of purposes, such as rolling back transactions, recovering the database, providing read consistency, etc. In some embodiments, the undo file 241 is a finite size and thus the database server 100 may overwrite the undo records to save space as the transactions occur. For example, the segments storing the undo records may be reused after the corresponding transaction ends (e.g. by committing or being rolled back). However, in other embodiments, the database server 100 may retain the undo records for a period of time after the corresponding transactions have ended. For example, the undo records may be retained to provide read consistency for long running queries.

Container database 103 also includes redo log 240, which the database server 100 uses to store data and/or metadata ("redo records") related to modifications performed on the container database 103. For example, each time the database server 100 changes a data block of the container database 103, the database server 100 also stores a redo record in the redo log 240 that identifies the block(s) being modified and specifies the before/after values.

In some embodiments, the database server identifies redo records based on the state of the database being modified. For example, the database server 100 may maintain a "system change number" (SCN) for the container database 103. The database server 100 increments the SCN each time a transaction is begun, committed or rollbacked on one of the underlying databases. The SCN may also be incremented for changes made by transactions, or for other events pertinent to managing transactions. The SCN is shared among the root database 210 and the pluggable databases. When the database server 100 generates a redo record, the redo record is tagged or otherwise associated with information identifying the database being modified and the corresponding SCN. Thus, the SCN serves to identify the state of the corresponding database at the time the redo record was created. In other embodiments, a timestamp may be used to the same effect.

The redo log 240, as a result, stores a stream of redo records that can be used by the database server 100 to replay modifications to the container database 103 when a recovery is required.

4.0 Application Containers

As mentioned above, application containers are used to consolidate metadata and database objects shared across a subset of PDBs within a CDB, provide efficient access to the member PDBs, and facilitate the patching and upgrading of applications.

Figure 3:
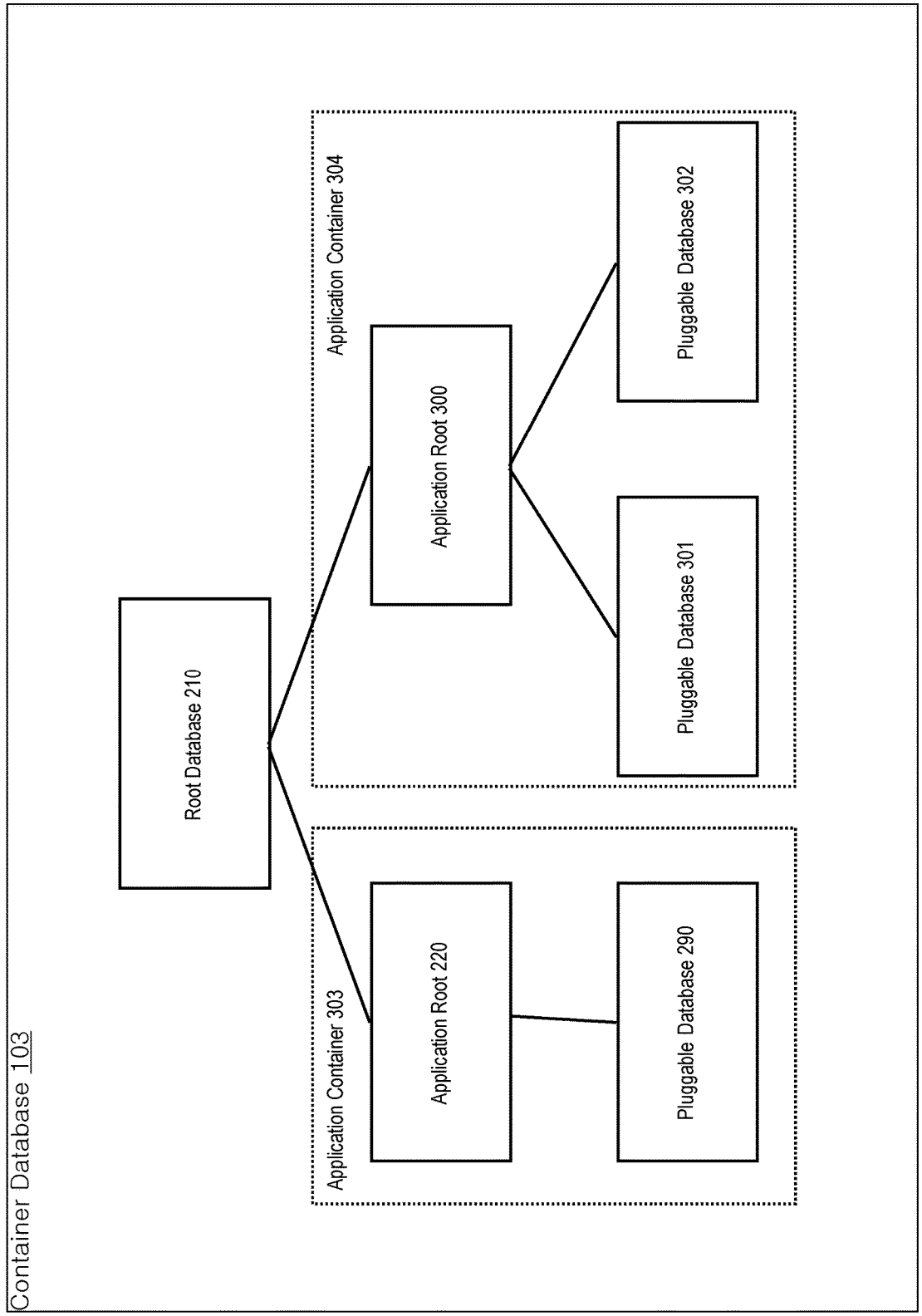
FIG. 3 illustrates an example logical hierarchy of a root databases, application roots, and pluggable databases according to an embodiment.

Within a CDB, the structure of the root database, application roots, and member PDBs of the application roots are logically laid out in a tree structure. FIG. 3 illustrates an example tree structure which illustrates a CDB with two different application containers. Although FIG. 3 illustrates only two application containers, in practice a CDB can have arbitrarily many number of application containers. Furthermore, in other embodiments, the root database may also have member PDBs of its own which do not belong to an application container.

In FIG. 3, container database 103 includes root database 210 which has member PDBs application root 220 and application root 300. Application root 220 has member PDB pluggable database 290, which together are collectively referred to as application container 303. Application root 300 includes member PDBs pluggable database 301 and pluggable database 302, which are collectively referred to as application container 304. In the hierarchy illustrated in FIG. 3, all pluggable databases (including the application roots) are members of the root database 210, pluggable database 290 is a member of application root 220, and pluggable database 301 and pluggable database 302 are members of application root 300. In addition, each application root is considered a member of itself and the root database 210 is also considered a member of itself.

4.1 Executing Commands on an Application Root

As discussed above, since all pluggable databases are members of the root database 210, commands issued while connected to the root database 210 can potentially affect any PDB defined within container database 103. However, commands issued while connected to an application root only affects members of the application root. For example, if the database client 107 were to connect to application root 300, a query issued at application root 300 could only be executed on application root 300 and its member PDBs pluggable database 301 and pluggable database 302. In this manner each application container acts as a virtual container database and thus limits the scope of commands issued at the application root to its member PDBs.

In some embodiments, queries which are intended to be executed over multiple member PDBs are denoted by a keyword that specifies that the query affects multiple PDBs. For example, the keyword "CONTAINERS" may be wrapped around a database object to specify that the query is to read from all copies of the database object across an application container. In the event that the query is to be limited to specific PDBs within the application container, a predicate, such as a "WHEREIN" clause can be included to limit the execution of the query to PDBs whose IDs match those specified by the WHEREIN clause. Thus, in some embodiments, each PDB within the container database 103 is tagged with an ID that is unique across the PDBs of the container database 103 to facilitate such features. When a command is received which utilizes the CONTAINERS keyword, the query is rewritten and executed separately in each of the implicated PDBs of the application container. The results from each of the PDBs are then aggregated and returned to the database client 107. For further information regarding the rewriting and optimizing of queries executed across multiple PDBs see "Implementing a Logically Partitioned Data Warehouse using a Container Map", by Thomas Baby, U.S. application Ser. No. 15/331,540, filed concurrently with this application on Oct. 21, 2016, which is hereby incorporated by reference for all purposes as though fully stated herein.

4.2 Data Linked and Metadata Linked Objects Example

As discussed above, in the context of an application root there are two types of objects, data-linked objects and metadata-linked objects. A data-linked object is one in which both the data and the metadata for the object are stored in the application root, specifically within the tablespace files and database dictionary of the application root respectively. Thus, data-linked objects are useful for objects, such as tables, for which the definition and the data are shared across the member PDBs. A metadata-linked object is one in which the data resides within the tablespace files of the member PDBs, but the definition of the object is stored in the database dictionary of the application root. Thus, a metadata-linked object is useful for objects which have a common definition across the member PDBs, but the data for the object is potentially unique between the member PDBs.

Figure 4:
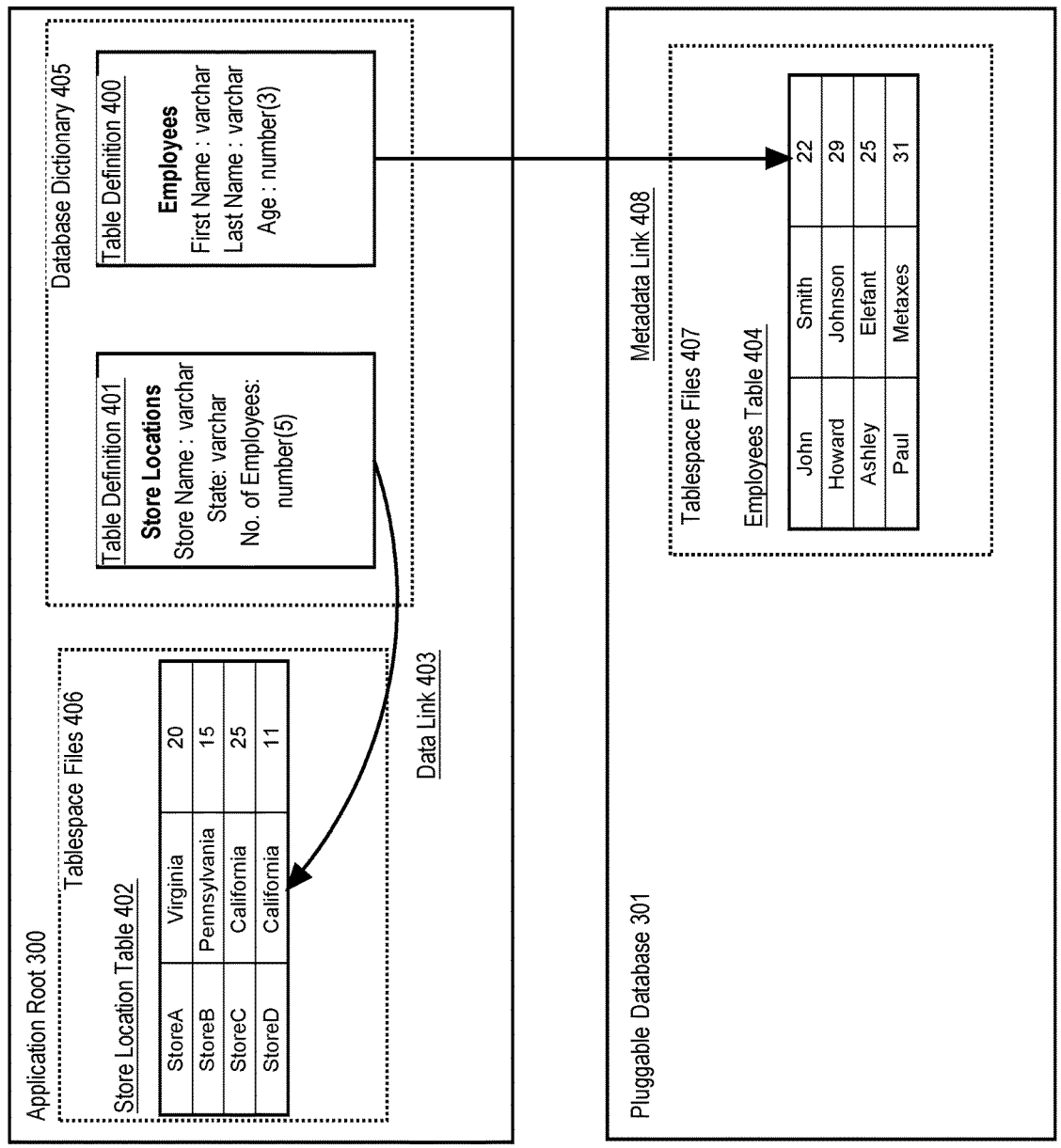
FIG. 4 illustrates an example of data-linked and metadata-linked objects according to an embodiment.

FIG. 4 illustrates an example of data-linked and metadata-linked objects according to an embodiment.

In FIG. 4, application root 300 stores a store location table 402 within tablespace files 406 and a table definition 401 for the store location table 402 within database dictionary 405. In this case the object is data linked 403 since the table definition 401 and the corresponding table 402 both stored within the application root 300. In this example, the store location table 402 may be the same for all stores since it is simply a listing of the location and details of each store front and therefore could be the same across the PDBs of the company who owns the stores.

In addition, in FIG. 4, employees table 404 is stored within tablespace files 407 within pluggable database 301 and the table definition 400 for the employees table 404 is stored within the database dictionary 405 of the application root 300. In this case the object is metadata linked 408 because the table definition 400 is stored in the application root 300 and the corresponding employees table 404 is stored in the pluggable database 301. In this example, the format or schema to which the employees table 404 adheres may be the same across store locations, but each store location may have a different set of employees listed in the employees table 404.

Thus, using the structures described above, each store location may be given a separate pluggable database, where the information unique to each store location (such as employees) is metadata linked 408 and the information that is shared across the store locations may be data-linked 403.

4.3 Creating an Application Root

In some embodiments, the application root 220 is created in response to the database server 100 receiving a command from the database client 107 specifying to create the application root 220. For example, the command may be received after the database client 107 establishes a session with the root database 210 of the container database 103. In some embodiments, the command is the same as the command to create a normal PDB within the container database 103, but instead includes additional flags or arguments which specify that the PDB to be created is an application root. In other embodiments, the command is distinct from the command used to create a normal PDB of the container database 103.

In some embodiments, the command which creates the application root 220 also specifies which existing PDBs are to be members of the application root 220. However, in other embodiments, the database server 100 automatically detects which PDBs should be members by inspecting metadata within the PDBs indicating the application the PDB supports and the version number of the application. If there is a match, the PDB becomes a member of the application root 220. Furthermore, after establishment of the application root 220, individual PDBs may be assigned to be members of the application root 220 by submitting commands. In some embodiments, changing the membership of the application root 220 can only occur through the root database 210, but other embodiments may allow PDBs to be added or removed from within the context of the application root 220.

4.4 Application Users and Roles

As described above, application roots can also be used to efficiently manage users and roles which are common across all member PDBs of the application root. These users and roles are referred to as "application users" and "application roles" respectively. Users may be defined by a user name or identifier, security information (e.g. private encryption keys, passwords, biometric data, and so forth), the permissions and roles assigned to the user, and so forth. Roles refer to a set of permissions which can be bundled together and assigned to users by referencing the name or identifier of the role, rather than individually granting the user each of the permissions. The examples provided in this section reference application root 220, but the features described herein may be applied to any application root.

In an embodiment, to create an application user or role, the database client 107 connects to the application root 220 and then issues a command to create the application user or role. In some embodiments, the database client 107 must connect to the application root 220 as a user with permissions sufficient to create new users and roles, such as an administrative user which is established when the application root 220 is initially created. In the case of application users, the command may specify the name or identifier of the application user, security information for the application user, and the permissions and/or roles to be assigned to the application user. However, in other embodiments the user may be created first and then assigned permissions and users with additional commands. In the case of application roles, the command may specify the name of the application role to create (which can be referenced when creating the user), and the permissions which are to be bundled into the application role. However, in other embodiments the role may be created first and then assigned permissions using additional commands. The information defining the application user or role that has been created is then stored in the database dictionary 221 of the application root 220.

In some embodiments, the information defining the application users and roles of the application container are mirrored within the database dictionaries of the member PDBs. One reason for performing this mirroring is to ensure that the users and roles are carried over to a new CDB (at least with respect to the transported PDB) should the PDB be transferred. In most cases, transferring is performed by copying the database dictionary and tablespace files of a PDB into a new location at a remote CDB. Thus, if the application users and roles are not mirrored into the database dictionary of the member PDBs, transferring the PDB to the new location will result in those users and roles being lost with respect to the transferred PDB. This mirroring may be performed automatically by the database server 100 in response to creating a new application user or role within the application root 220.

In some embodiments, when the database client 107 connects to the application root 220 or any of the member PDBs of the application root 220, the user name/identifier and security information supplied by the database client 107 is compared to the user name/identifier and security information associated with the application user. Depending on whether or not the DBMS implements mirroring of the application users and roles, the definition of the application user within the database dictionary 221 of the application root 220 is checked or alternatively the mirrored copy of the definition within the database dictionary of the member PDB. Then, when the database client 107 submits commands, the commands are checked against the permissions and application roles assigned to the application user. If the application user has sufficient permissions to execute the command, the command is executed, otherwise an error is returned to the database client 107.

4.5 Patching and Upgrading an Application

As discussed above, application roots can also be used for the effective management of patches and updates to an application across the application container. As used herein, a patch refers to modifications made within an application container which are compatible with previous versions of the application whereas an update refers to modifications which cause previous versions of the application to become incompatible.

Figure 5:
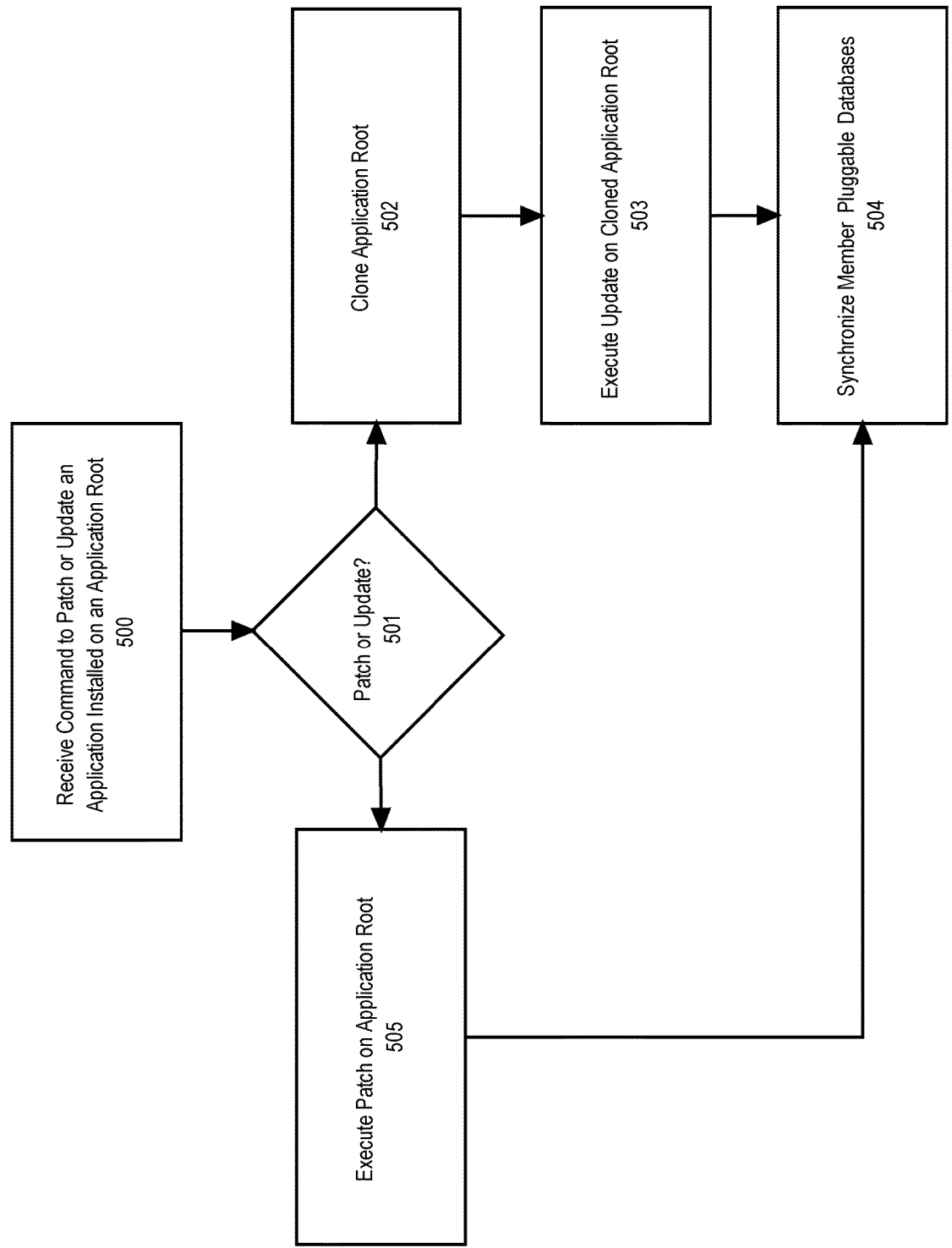
FIG. 5 illustrates an example process flow for patching or updating an application according to an embodiment.

FIG. 5 illustrates a process flow in block diagram form for performing a patch or update of an application according to an embodiment. Although FIG. 5 illustrates particular blocks that are performed in a particular order, other embodiments may recorder the blocks, combine blocks, separate the blocks out into different sub-blocks, add blocks, or remove blocks, compared to the illustration of FIG. 5. In order to illustrate clear examples, it will be assumed that the patch or update is executed on application root 220.

In FIG. 5, at block 500, the database server 100 receives a command to patch or update an application installed on an application root 220. In some embodiments, the database client 107 establishes a session with the application root 220 and then issues a command which references a set of commands (e.g. SQL commands located within a script) which when executed will patch or update the application. In some embodiments, the set of commands is divided into commands which update the application root 220 and commands which are executed on member PDBs to synchronize them to the same application version as the application root 220.

At block 501, the database server 100 determines whether the command indicates a patch or an update. In some embodiments, the command itself specifies whether a patch or an update is being performed. For example, an identifier, flag, or keyword may be inserted into the command to specify whether a patch or an update is being performed. In other embodiments, the determination may be made by inspecting the set of commands that will be issued to the application root. For example, the database server 100 may use a set of rules or logic which determines whether a patch or an update is being performed based on the modifications that will be performed by the set of commands. For instance, the database server 100 may determine the command indicates a patch if only data of objects are being modified, but not the definitions of the objects, and otherwise determine that an update is being performed. Another example may be if data or metadata is erased or modified to erase existing attributes of an object that erasure must occur in a patch since previous versions may have relied upon the existence of those objects and/or specific attributes/columns of the objects. If the database server 100 determines that the command applies an upgrade, the database server 100 proceeds to block 505, otherwise if the command applies a patch the database server proceeds to block 503.

At block 502, the database server 100 clones the application root 300. Cloning the application root has at least two purposes. First, since the update is applied to the clone, rather than the active application root 300, the application root 220 and member PDBs can continue servicing commands while the clone is updating. Second, maintaining both the clone and the original application root 220 allows for different versions of the applications to be serviced concurrently. For example, each version of the application can function within its own application container, with the application root of the newer version being the clone and the application root of the older version being the original application root 220. To perform the cloning the database server 100 copies the database dictionary 221 and tablespace files 226 of the application root 220 into a new PDB.

At block 503, the database server 100 executes the update on the cloned application root. In an embodiment, the database server 100 executes the set of commands referenced by the command received at block 500 in order to perform the update on the cloned application root. For embodiments which divide the set of commands into commands for the application root and commands for the member PDBs, the former is applied at block 503. The update once applied to the cloned application root modifies one or more definitions and objects of the clone and updates the version number of the application supported by the clone.

At block 504, the database server 100 synchronizes member PDBs of the application root 200.

In some embodiments, the database server 100 automatically synchronizes the member PDBs of the application root 200. For example, the database server 100 may connect to each of the member PDBs and execute a set of commands which updates the member PDB to the version number of the clone database. In some embodiments, synchronization involves comparing the version number stored at the PDB with the version number of the application root to which the PDB is to be synched and executing commands which bridge the difference between the application versions. During the synchronization one or more database objects or definitions stored within the member PDBs may be altered, references to the application root 220 are replaced by references to the cloned application root (in the case of updates), and the version number of the application serviced by the PDBs is updated. In addition, in the case of updates, after the PDBs have been synchronized and updated to the new version of the application, the original application root 220 may optionally be removed.

In other cases, an administrator of the DBMS may want to update some PDBs to the new application version, but allow other PDBs to continue using the old version of the application. Thus, the administrator (using the database client 107) may submit commands to each of the member PDBs to be upgraded that synchronize those PDBs to the new version. Thus, the other PDBs which have not been updated can continue to use the original application root 220 and each version can continue to be supported concurrently using two different application containers. In some embodiments, the database server 100 compares the version number of the PDB and the version number of the In the event that the command executes a patch, depending on the nature of the patch the member PDBs may not require any modifications and thus do not require synchronizing. In such cases, block 504 may be skipped. Otherwise, the database server 100 performs automatic or manual synchronization of the member PDBs. Since no clone is generated during a patch, references to the application root 220 do not have to be modified to point to a clone.

At block 505, the database server 100 executes the patch on the application root 220. In an embodiment, the database server 100 executes the set of commands referenced by the command received at block 500 in order to perform the update on the cloned application root. For embodiments which divide the set of commands into commands for the application root and commands for the member PDBs, the former is applied at block 503. The patch once applied to the cloned application root modifies one or more definitions and objects of the clone and updates the version number of the application supported by the clone. However, unlike with updates, the patch is applied directly to the application root 220 without the use of a clone. Since the patch only includes modifications which are compatible with previous versions of the application, the versioning concerns involved with applying an update do not apply to a patch. Thus, there is no need to have two separate versions of the application root 220 running concurrently for each version of the application.

4.6 Transporting Application Roots

As discussed above, one of the advantages of PDBs is the ability to transport a PDB from one CDB to another CDB. For example, this may be performed for load balancing purposes when the infrastructure supporting the CDB becomes overloaded, necessitating the transport of some PDBs to a new CDB to balance the load.

In some embodiments, transporting a PDB involves the transfer of the database dictionary and tablespace files of the PDB to a new CDB. In most cases the transfer is fairly straight forward, merely involving the copying of the respective database dictionaries and tablespace files to new PDBs established within the target CDB. However, the transfer of application roots could potentially be trickier. In some embodiments, the CDB is limited to two levels of roots, the first being the root of the CDB and the others being the application roots for the various applications supported by the CDB. However, it may be the case that the application root is to be transferred as to the new CDB as a member PDB of another application root within the new CDB. Since further levels of roots are not allowed in such embodiments, after the transfer of the application root to the new CDB a script is executed which transforms the application root into a normal PDB. For example, the information identifying the member PDBs of the application root may be stripped out, data-linked and metadata-linked objects which conflict with the new application root are modified to refer to the new application root, stripped out of the transported application root, and/or converted into user data unique to the new PDB, and so forth. The end result is that the application root after the transfer becomes an ordinary PDB under a new application root at the target CDB.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
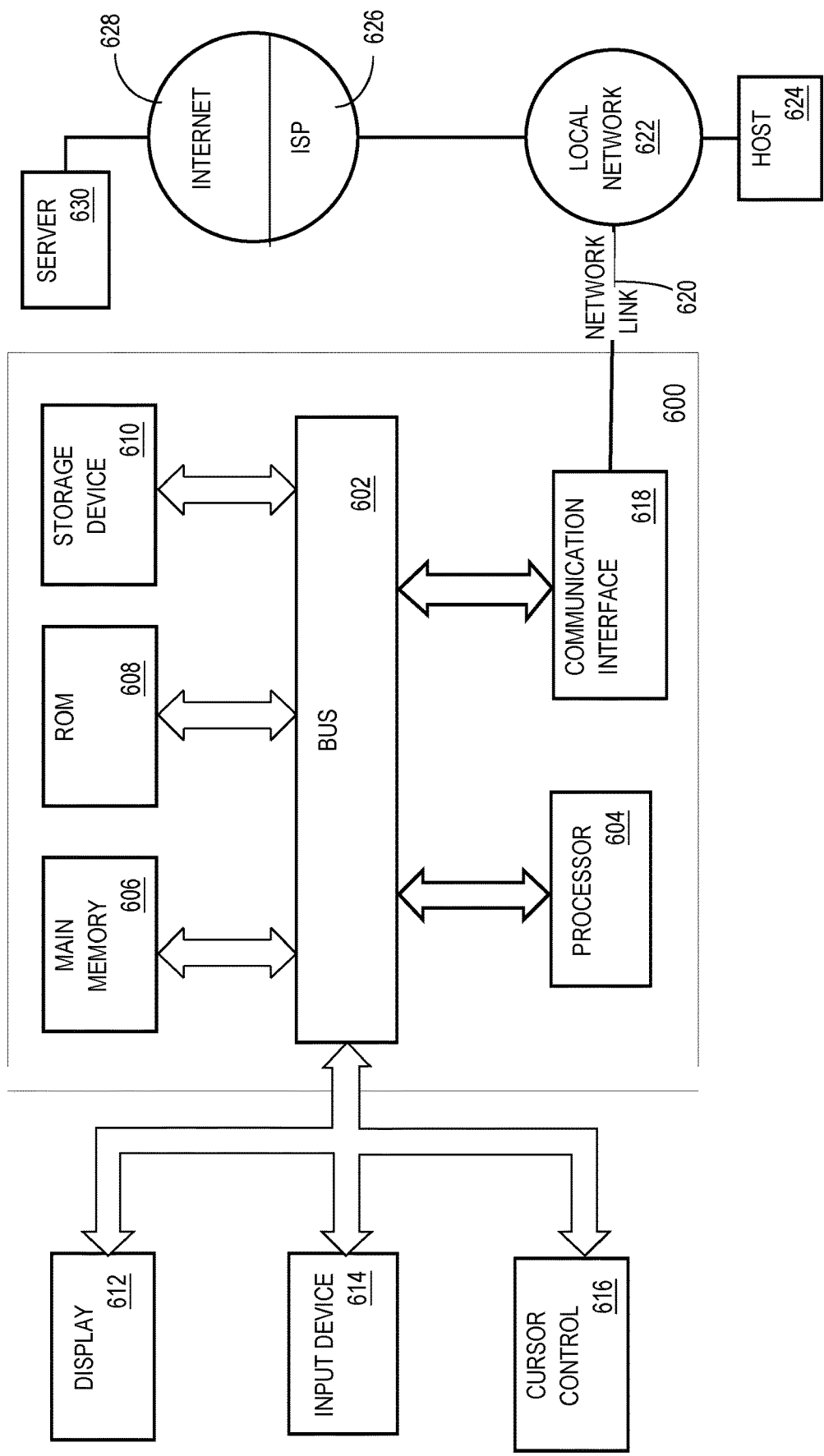
FIG. 6 is a block diagram that illustrates an example computer system upon which an embodiment of the invention may be implemented.

For example, FIG. 6 is a block diagram that illustrates an example computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6.0 Additional Disclosure

Additional embodiments are described in the following clauses:

1. A method comprising: a database server receiving a query from a database client that is to be applied at an application root of a container database, wherein: the query identifies at least a particular database object, the database server provides access to the container database, the container database includes a root database which stores one or more database objects and metadata related to the one or more database objects that are shared among a plurality of pluggable databases stored within the container database, the plurality of pluggable databases includes the application root, and the application root stores second one or more database objects and second metadata related to the second one or more database objects that are shared among a subset of the plurality of pluggable databases stored within the container database which are utilized by an common application; in response to receiving the query, the database server executing the query based on a database dictionary of the application root to generate a result set; the database server returning the result set to the database client.

2. The method of Clause 1, wherein the particular database object is a meta-data linked object where a definition of the particular database object is stored in the database dictionary of the application root and data for the database object is stored within a respective one or more tablespace files of each pluggable database within the subset.

3. The method of Clause 1, wherein the particular database object is a data-linked object where a definition of the particular database object is stored in the database dictionary of the application root and data for the database object is stored within one or more tablespace files of the application root.

4. The method of Clause 1, further comprising: the database server receiving an instruction to create an application user that is common across the subset; in response to receiving the instruction to create the application user, the database server storing information in the database dictionary of the application root that defines the application user.

5. The method of Clause 4, further comprising: in response to receiving the instruction to create the application user, the database server storing information in a respective database dictionary of each pluggable database of the subset that defines the application user.

6. The method of Clause 1, further comprising: the database server receiving an instruction to create an application role that is common across the subset; in response to receiving the instruction to create the application role, the database server storing information in the database dictionary of the application root that defines the application role.

7. The method of Clause 6, further comprising: in response to receiving the instruction to create the application role, the database server storing information in a respective database dictionary of each pluggable database of the subset that defines the application role.

8. The method of Clause 1, further comprising: the database server receiving an instruction that specifies to update the application root to a new version of the common application, wherein the instruction specifies or references a set of instructions to execute at the application root to update to the new version; in response to receiving the instruction, the database server creating a clone of the application root; the database server executing the set of instructions on the clone; the database server synchronizing one or more pluggable databases of the subset to the new version of the common application, wherein synchronizing the one or more pluggable databases causes the database server to switch one or more references to the application root stored by the one or more pluggable databases to instead reference the clone.

9. The method of Clause 8, wherein the database server synchronizing the one or more pluggable databases of the subset to the new version of the common application is performed in response to receiving one or more commands specifying to synchronize the one or more pluggable databases to the new version of the common application.

10. The method of Clause 8, wherein the one or more pluggable databases includes at least one fewer pluggable database than the subset.

11. The method of Clause 1, further comprising: the database server receiving an instruction that specifies to patch the application root, wherein the instruction specifies or references a set of instructions to execute at the application root to patch the application root; in response to receiving the instruction, the database server executing the set of instructions on the application root.

12. One or more non-transitory computer-readable media storing instructions that, when executed by one or more computing devices, causes performance of any one of the methods recited in Clauses 1-11.

13. A system comprising one or more computing devices comprising components, implemented at least partially by computing hardware, configured to implement the steps of any one of the methods recited in Clauses 1-11.

What is claimed is:

1. A method comprising:
a database server storing: a) a multitenant container database, b) a root database and a plurality of pluggable databases, including a plurality of application roots, including a particular application root, in the multitenant container database and, c) in the root database, one or more database objects and metadata related to the one or more database objects that are shared among the plurality of pluggable databases;
the database server storing, in the particular application root, second one or more database objects and second metadata related to the second one or more database objects that are shared among a subset of the plurality of pluggable databases in the multitenant container database which are utilized by a common application;
the database server receiving a query from a database client that is to be applied to the particular application root in the multitenant container database, wherein the query identifies at least a particular database object;

in response to receiving the query, the database server executing the query based on a database dictionary of the particular application root to generate a result set; and the database server returning the result set to the database client.

2. The method of claim 1, wherein the particular database object is a meta-data linked object where a definition of the particular database object is stored in the database dictionary of the particular application root and data for the particular database object is stored within a respective one or more tablespace files of each pluggable database within the subset.

3. The method of claim 1, wherein the particular database object is a data-linked object where a definition of the particular database object is stored in the database dictionary of the particular application root and data for the particular database object is stored within one or more tablespace files of the particular application root.

4. The method of claim 1, further comprising:
the database server receiving an instruction to create an application user that is common across the subset;
in response to receiving the instruction to create the application user, the database server storing information in the database dictionary of the particular application root that defines the application user.

5. The method of claim 4, further comprising:
in response to receiving the instruction to create the application user, the database server storing information in a respective database dictionary of each pluggable database of the subset that defines the application user.

6. The method of claim 1, further comprising:
the database server receiving an instruction to create an application role that is common across the subset;
in response to receiving the instruction to create the application role, the database server storing information in the database dictionary of the particular application root that defines the application role.

7. The method of claim 6, further comprising:
in response to receiving the instruction to create the application role, the database server storing information in a respective database dictionary of each pluggable database of the subset that defines the application role.

8. The method of claim 1, further comprising:
the database server receiving an instruction that specifies to update the particular application root to a new version of the common application, wherein the instruction specifies or references a set of instructions to execute at the particular application root to update to the new version;
in response to receiving the instruction, the database server creating a clone of the particular application root;
the database server executing the set of instructions on the clone;
the database server synchronizing one or more pluggable databases of the subset to the new version of the common application, wherein synchronizing the one or more pluggable databases causes the database server to switch one or more references to the particular application root stored by the one or more pluggable databases to instead reference the clone.

9. The method of claim 8, wherein the database server synchronizing the one or more pluggable databases of the subset to the new version of the common application is performed in response to receiving one or more commands specifying to synchronize the one or more pluggable databases to the new version of the common application.

10. The method of claim 8, wherein the one or more pluggable databases includes at least one fewer pluggable database than the subset.

11. The method of claim 1, further comprising:
the database server receiving an instruction that specifies to patch the particular application root, wherein the instruction specifies or references a set of instructions to execute at the particular application root to patch the particular application root;
in response to receiving the instruction, the database server executing the set of instructions on the particular application root.

12. A non-transitory computer-readable storage medium storing one or more sequences of instructions which, when executed by one or more processors, cause:
a database server storing: a) a multitenant container database, b) a root database and a plurality of pluggable databases, including a plurality of application roots, including a particular application root, in the multitenant container database and, c) in the root database, one or more database objects and metadata related to the one or more database objects that are shared among the plurality of pluggable databases;
the database server storing, in the particular application root, second one or more database objects and second metadata related to the second one or more database objects that are shared among a subset of the plurality of pluggable databases in the multitenant container database which are utilized by a common application;
the database server receiving a query from a database client that is to be applied to the particular application root in the multitenant container database, wherein the query identifies at least a particular database object;
in response to receiving the query, the database server executing the query based on a database dictionary of the particular application root to generate a result set;
the database server returning the result set to the database client.

13. The non-transitory computer-readable storage medium of claim 12, wherein the particular database object is a meta-data linked object where a definition of the particular database object is stored in the database dictionary of the particular application root and data for the particular database object is stored within a respective one or more tablespace files of each pluggable database within the subset.

14. The non-transitory computer-readable storage medium of claim 12, wherein the particular database object is a data-linked object where a definition of the particular database object is stored in the database dictionary of the particular application root and data for the particular database object is stored within one or more tablespace files of the particular application root.

15. The non-transitory computer-readable storage medium of claim 12, wherein the one or more sequences of instructions include instructions that, when executed by said one or more processors cause:
the database server to receive an instruction to create an application user that is common across the subset;
in response to receiving the instruction to create the application user, the database server to store information in the database dictionary of the particular application root that defines the application user.

16. The non-transitory computer-readable storage medium of claim 15, wherein the one or more sequences of instructions include instructions that, when executed by said one or more processors cause:
  in response to receiving the instruction to create the application user, the database server to store information in a respective database dictionary of each pluggable database of the subset that defines the application user.

17. The non-transitory computer-readable storage medium of claim 12, wherein the one or more sequences of instructions include instructions that, when executed by said one or more processors cause:
  the database server to receive an instruction to create an application role that is common across the subset;
  in response to receiving the instruction to create the application role, the database server to store information in the database dictionary of the particular application root that defines the application role.

18. The non-transitory computer-readable storage medium of claim 17, wherein the one or more sequences of instructions include instructions that, when executed by said one or more processors cause:
  in response to receiving the instruction to create the application role, the database server to store information in a respective database dictionary of each pluggable database of the subset that defines the application role.

19. The non-transitory computer-readable storage medium of claim 12, wherein the one or more sequences of instructions include instructions that, when executed by said one or more processors cause:
  the database server to receive an instruction that specifies to update the particular application root to a new version of the common application, wherein the instruction specifies or references a set of instructions to execute at the particular application root to update to the new version;
  in response to receiving the instruction, the database server to create a clone of the particular application root;
  the database server to execute the set of instructions on the clone;
  the database server to synchronize one or more pluggable databases of the subset to the new version of the common application, wherein synchronizing the one or more pluggable databases causes the database server to switch one or more references to the particular application root stored by the one or more pluggable databases to instead reference the clone.

20. The non-transitory computer-readable storage medium of claim 19, wherein the database server synchronizing the one or more pluggable databases of the subset to the new version of the common application is performed in response to receiving one or more commands specifying to synchronize the one or more pluggable databases to the new version of the common application.

21. The non-transitory computer-readable storage medium of claim 19, wherein the one or more pluggable databases includes at least one fewer pluggable database than the sub set.

22. The non-transitory computer-readable storage medium of claim 12, wherein the one or more sequences of instructions include instructions that, when executed by said one or more processors cause:
  the database server to receive an instruction that specifies to patch the particular application root, wherein the instruction specifies or references a set of instructions to execute at the particular application root to patch the particular application root;
  in response to receiving the instruction, the database server to execute the set of instructions on the particular application root.

23. A system comprising:
  a database server comprising one or more processors;
  a multitenant container database comprising one or more non-transitory storage mediums;
  in the multitenant container database, a root database and a plurality of pluggable databases, including a plurality of application roots, including a particular application root;
  in the root database, one or more database objects and metadata related to the one or more database objects that are shared among the plurality of pluggable databases;
  in the particular application root, second one or more database objects and second metadata related to the second one or more database objects that are shared among a subset of the plurality of pluggable databases in the multitenant container database which are utilized by a common application;
  wherein the database server is configured to:
    store the multitenant container database, the root database, the plurality of pluggable databases and, in the root database, one or more database objects and metadata related to the one or more database objects that are shared among the plurality of pluggable databases;
    store, in the particular application root, second one or more database objects and second metadata related to the second one or more database objects that are shared among a subset of the plurality of pluggable databases in the multitenant container database which are utilized by a common application;
    receive a query from a database client that is to be applied to the particular application root in the multitenant container database, wherein the query identifies at least a particular database object;
    execute, in response to receiving the query, the query based on a database dictionary of the particular application root to generate a result set; and
    return the result set to the database client.

* * * * *

UNITED STATES PATENT AND TRADEMARK OFFICE
CERTIFICATE OF CORRECTION

PATENT NO. : 10,572,551 B2  
APPLICATION NO. : 15/331525  
DATED : February 25, 2020  
INVENTOR(S) : Kruglikov et al.

Page 1 of 1

It is certified that error appears in the above-identified patent and that said Letters Patent is hereby corrected as shown below:

In the Drawings

On sheet 2 of 6, in FIG. 2, under Reference Numeral 210, Line 2, delete "Pluggabe" and insert -- Pluggable --, therefor.

In the Specification

In Column 2, Line 49, delete "nonschema" and insert -- non-schema --, therefor.

In Column 3, Line 50, delete "6.0" and insert -- 5.0 --, therefor.

In Column 3, Line 51, delete "7.0" and insert -- 6.0 --, therefor.

In Column 4, Line 6, delete "Once" and insert -- One --, therefor.

In Column 9, Line 36, delete "303," and insert -- 203, --, therefor.

In Column 14, Line 34, delete "recorder" and insert -- record --, therefor.

In the Claims

In Column 24, Line 4, in Claim 21, delete "sub set." and insert -- subset. --, therefor.

Signed and Sealed this  
Tenth Day of November, 2020

Andrei Iancu  
*Director of the United States Patent and Trademark Office*